US007607422B2

(12) United States Patent
Carlson et al.

(10) Patent No.: US 7,607,422 B2
(45) Date of Patent: *Oct. 27, 2009

(54) METHODS OF FLEXIBLE FUEL ENGINE CONVERSIONS

(76) Inventors: Grant B Carlson, P.O. Box 171, Hammondsport, NY (US) 14840; Karl Heise, 114 River Meadow Dr., Rochester, NY (US) 14623

( * ) Notice: Subject to any disclaimer, the term of this patent is extended or adjusted under 35 U.S.C. 154(b) by 64 days.

This patent is subject to a terminal disclaimer.

(21) Appl. No.: 11/954,105

(22) Filed: Dec. 11, 2007

(65) Prior Publication Data

US 2008/0091334 A1    Apr. 17, 2008

Related U.S. Application Data

(63) Continuation-in-part of application No. 11/379,823, filed on Apr. 24, 2006, now Pat. No. 7,305,939.

(60) Provisional application No. 60/674,435, filed on Apr. 25, 2005.

(51) Int. Cl.
*F02D 41/14* (2006.01)

(52) U.S. Cl. ............... 123/672; 123/478; 701/109

(58) Field of Classification Search ........... 123/27 GE, 123/525, 431, 472, 478, 479, 305, 672, 673, 123/703, 704, 480; 701/103–105, 109; 60/276, 60/285, 286
See application file for complete search history.

(56) References Cited

U.S. PATENT DOCUMENTS

| 4,594,968 | A | 6/1986 | Degobert et al. |
| 4,635,608 | A | 1/1987 | Carroll |
| 4,711,223 | A | 12/1987 | Carroll |
| 4,915,084 | A | 4/1990 | Gonze |
| 4,922,862 | A | 5/1990 | Casacci |
| 4,945,863 | A | 8/1990 | Schmitt et al. |
| 4,955,345 | A | 9/1990 | Brown et al. |
| 4,995,367 | A | 2/1991 | Yamauchi et al. |
| 5,092,305 | A | 3/1992 | King et al. |
| 5,119,671 | A | 6/1992 | Kopera et al. |
| 5,150,685 | A | 9/1992 | Porter et al. |
| 5,179,926 | A | 1/1993 | Ament |
| 5,941,217 | A | 8/1999 | Cheng et al. |

(Continued)

FOREIGN PATENT DOCUMENTS

GB    2232794    * 12/1990

(Continued)

*Primary Examiner*—Hai H Huynh

(57) ABSTRACT

Methods and apparatus are disclosed for converting and optimizing the fuel system of an internal combustion engine in a pre-existing (used) vehicle to be fuel flexible and thus to operate on a mixture of fuels (like ethanol and gasoline) from a single fuel tank. The conversion includes adding a fuel composition sensor installed in the fuel line and/or adding an exhaust gas oxygen sensor installed in the engine's exhaust in addition to adding an electronic control unit with at least one fuel injector driver circuit for controlling an output signal to at least one fuel injector for controlling the air to fuel ratio of the engine. The electronic control unit can control both engine ignition timing and the air to fuel ratio of the engine based upon the composition of fuel mixture in the fuel tank. The electronic control unit can also control other aspects of engine operation like intake manifold boost for those engines that have turbo or superchargers.

27 Claims, 9 Drawing Sheets

Flexible Fuel Conversion of OEM Fuel Injection System

U.S. PATENT DOCUMENTS 7,305,939 B2 * 12/2007 Carlson .................. 123/27 GE
7,349,790 B2 *  3/2008 Sremac et al. .............. 701/104
7,404,397 B2 *  7/2008 Dobeck ...................... 123/672
2005/0273246 A1 12/2005 Griese
2006/0236976 A1 10/2006 Carlson

FOREIGN PATENT DOCUMENTS

JP         6-288956    * 10/1994

* cited by examiner

METHODS OF FLEXIBLE FUEL ENGINE CONVERSIONS

REFERENCE TO RELATED APPLICATIONS

This application is a continuation-in-part of U.S. patent application Ser. No. 11/379,823 entitled, "Addition of Flexible Fuel Engine Control System", filed Apr. 24, 2006 which claims the benefit of Provisional Patent Application No. 60/674,435 which was filed Apr. 25, 2005, both of which are incorporated by reference.

FIELD OF THE INVENTION

Conversion or retrofitting conventionally fueled gasoline and diesel OEM type engines to operate additionally on alternate fuels like E85, M85 and biodiesel.

BACKGROUND

With the advent of alternative fuels like alcohol, biodiesel and mixed fuels like, E85 (85% ethanol and 15% gasoline) and M85 (85% methanol and 15% gasoline) there is a desire to use them in motor vehicles, motorboats and other motorized machines like trucks, tractors, lawnmowers, etc. that were not previously designed to operate on such alternative fuels. With gasoline and diesel prices rising to record levels, alternate fuels are starting to make inroads with average American consumers. Also atmospheric pollution generated by exhaust emissions from conventional gasoline or diesel powered internal combustion engines is a well-documented problem. Not only do alternate fuels burn cleaner with less harmful air pollution, the fuels can be made here at home in the United States from a variety of agricultural feedstock thereby reducing the consumption of foreign oil.

A motor vehicle capable of burning mixtures of gasoline and alcohol is commonly called a Flexible Fuel Vehicle (FFV). Today's commercially available FFVs typically burn any mixture from 85% ethanol or methanol to 100% gasoline. A diesel FFV can burn any mixture of diesel and biodiesel and ethanol is also known to be mixed with diesel. The operation of a FFV is a well-known art. They all use a single fuel reservoir or tank and the fuel to alcohol ratio in the tank is often measured directly using a fuel composition sensor or via exhaust feedback from an exhaust gas sensor. The information from either type of sensor is read by the engine's control module and the result is used to control the quantity of fuel being fed into the engine and thereby the engine's air to fuel ratio.

Controlling the quantity of fuel is necessary because alcohol fuels like ethanol and methanol have less energy per unit volume than gasoline or diesel and require a much smaller air to fuel ratio when burned in an internal combustion engine. While gasoline has an ideal air to fuel ratio of about 14 to 1, pure ethanol has a ratio of about 9 to 1. A fuel injection system in a FFV instantly compensates to maintain stoichiometric over wide percentage changes in the fuel mix. Therefore the principal advantage of a FFV is its ability to arbitrarily be refueled both with pure fuels and mixed fuels.

In the late 1990s, automotive manufactures began producing FFVs. Even though FFVs today make up a small percentage of vehicle sales there is a growing need for FFVs. The need is being driven mostly by the rise in crude oil prices, the desire for reduced exhaust emissions, and the need to reduce the import of foreign oil. Since there are only a few vehicle models made as FFVs, there is growing need to modify previously manufactured vehicles like classic cars, trucks and SUVs to make them fuel flexible. Classic cars and modern sports cars with high compression engines typically get poor gas mileage, have high levels of emissions and will additionally benefit from the high octane of alcohol based alternate fuels. Therefore there is a need to convert conventional gasoline and diesel burning vehicles already being used on the highways today into Flexible Fuel Vehicles.

Since these vehicles were not manufactured to operate on alternate fuels, the addition of a flexible fuel engine control system is needed. Although the parent patent application disclosed several methods and corresponding apparatus for retrofitting engines that originally were manufactured with either carburetors or electronic fuel injection, the patent application did not address the optimization needed in order to obtain peak performance of the converted engine. The flex fuel engine control system added to the engine must be optimized to ensure the engine operates at its highest efficiency regardless of the mixture of fuel used. This is important because the octane ratings and energy released by the same volume of the alternate vs. conventional fuels can be quite different.

When converting an OEM type engine that has an OEM type carburetor, most often carburetors have to be rebuilt as their seals and gaskets are either worn out or are not compatible with an alternate fuel like alcohol. Even after a rebuild of the gaskets and seals, the throttle shafts of the carburetor may be worn enough to cause the carburetor to leak air at the throttle plates. In some cases this leakage is enough to cause drive-ability issues at idle and low speeds as the leak upsets the carburetors ability to control the air to fuel mixtures for proper combustion. In other cases where the leak is only minor, just a change in emission levels is noticeable.

When converting an OEM type engine with a carburetor, it is necessary to supplement the carburetor's flow with a wide dynamic range of fuel flow. Alcohol and gasoline fuels burn with very different air to fuel ratios. Because the amount of alcohol in OEM fuel tank mixtures can vary in ratio from 0 to 100%, the amount of fuel added by the flex fuel control system may be quite small or very large at any given time. This wide dynamic range of fuel delivery often exceeds the capability of modern day fuel injectors and thus may require additional injectors in order to provide the supplemental fuel flow for Flex Fuel operation.

SUMMARY

The problem is solved by adding a flexible fuel engine control system to a traditional gasoline or diesel fuel injected vehicle where the flexible fuel control system does not replace but instead supplements the OEM type of fuel system and does not bypass or modify any of the vehicle's original pollution control devices. The major components of the flexible fuel control system are a flexible fuel controller module, an ignition control circuit, a fuel composition sensor or exhaust gas oxygen (O2) sensor and at least one fuel injector driver for controlling at least one fuel injector.

The present invention discloses how a flexible fuel engine control system is used to modify an OEM type engine. The invention also discloses how the control system optimizes the OEM type engine via ignition control and also changes in the engine's compression ratio or intake manifold boost to ensure that the OEM type engine operates at its highest efficiency regardless of the fuel composition.

In the first preferred embodiment of the invention, the flexible fuel control unit conditions the fuel injector driver outputs of a fuel injected OEM type ECM and modifies the OEM ECMs electrical signal(s) based upon sensor input received by either a fuel composition sensor or an O2 sensor. The flexible fuel controller then sends the modified signal via its own fuel injector driver(s) on to fuel injector(s). In this manner the fuel injector pulse width is modified to maintain proper stoichiometric engine operation over a wide range of fuel mixtures.

The second preferred embodiment of the invention discloses the addition of the flexible fuel engine control system to an OEM type engine that was originally manufactured with an OEM type carburetor or throttle body. In this case, the flexible fuel control unit reads various sensors about the engine including those of a fuel composition and/or an O2 sensor and sends electrical signal(s) to fuel injector(s) added to the engine. In case where the engine had a carburetor, the carburetor may be replaced with a throttle body or in cases where the carburetor is retained it then may or may not flow fuel. It may just flow air acting as an inexpensive throttle body. In the case where the engine came with an OEM type Throttle Body Injection (TBI) unit, the TBI unit may or may not flow fuel.

ADVANTAGES OF THE INVENTION

A major advantage of the present invention is the reduction of air pollution and greenhouse gases associated with the converted vehicle's ability to burn alternate fuels. Costs to fuel the vehicle are also reduced, as alternate fuels are now cheaper to purchase than pure gasoline. Another major advantage is the switch to alternate fuel reduces America's dependency on foreign oil and in turn benefits US farmers and the US economy.

One other desirable feature of flexible fuel control system of the present invention is that the system does not interfere with any of the engine's original sensors or emission control devices including OBD. This is important for two major reasons. One reason is the ease of EPA approval for the installation of the conversion system and the other is the lack of redundancy among component use. In total these translate into an inexpensive conversion for the consumer.

DRAWINGS

DETAILED DESCRIPTION

Figure 1:
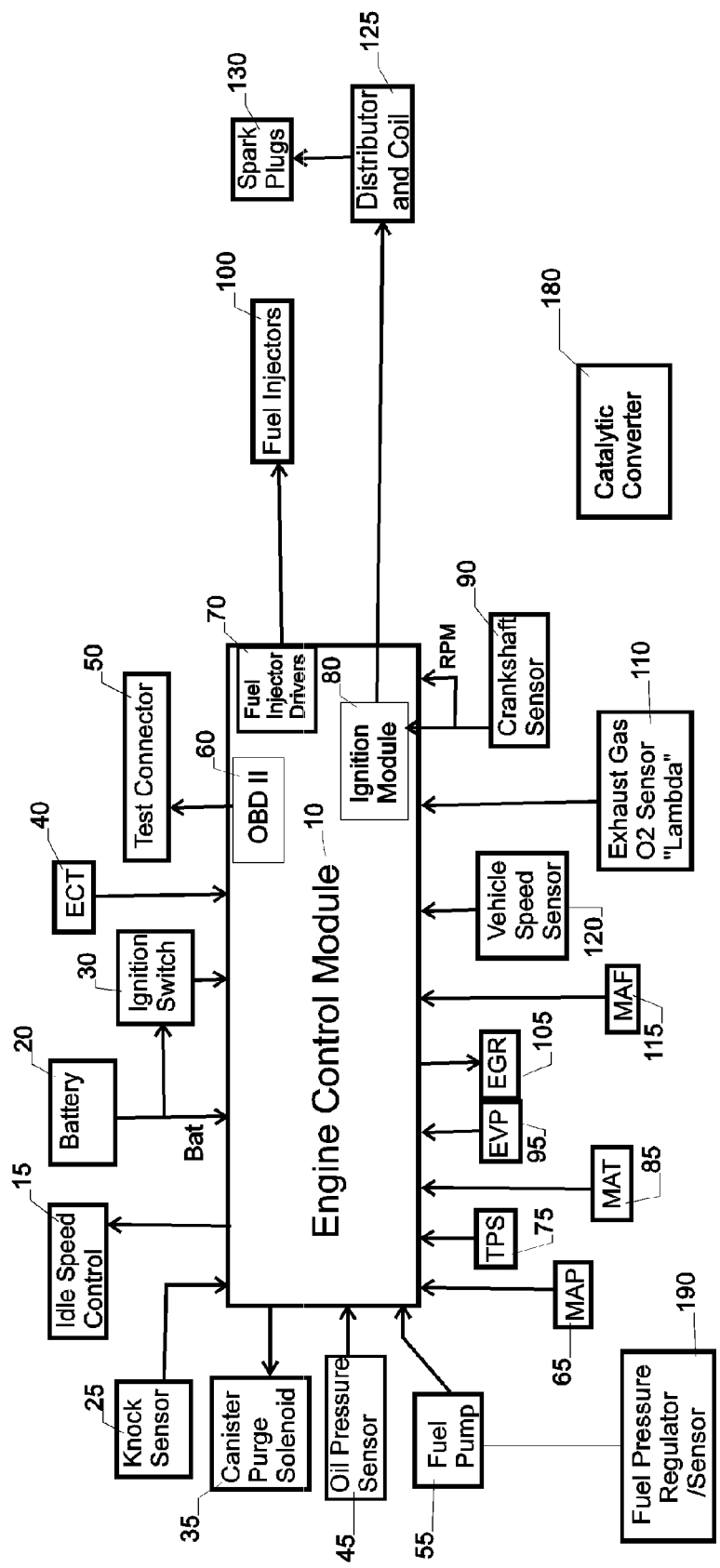
FIG. 1 is a diagram of a typical OEM Electronic Fuel Injection (EFI) system

Referring to FIG. 1, the major components of a modern Electronic Fuel Injection (EFI) system are shown. These are common components for gasoline engines in operation today. Outside of a brief description, a detailed functional description of the system will not be taught here but rather the system is presented to form a basis for the first embodiment of the present invention shown in FIG. 2.

The heart of an EFI system is the Engine Control Module (ECM) 10. The ECM 10 typically contains a microcontroller that receives information from a variety of sensors such to control the operation of the engine. The ECM 10 controls the operation of the engine by controlling the timing of the firing of the Spark Plug(s) 130 and by metering the consumption of fuel via the Fuel Injector(s) 100. The ECM also controls other aspects primarily related to the engine's exhaust emissions. Other important parts of the system are the Fuel Pump 55 that moves fuel from the gas tank (not shown) to the engine (not shown). The Battery 20 is used to provide electrical power needed to start the engine. The Ignition Switch 30 is used to control the starting and stopping of the engine. Most EFI fuel systems use a Fuel Pressure Regulator or Sensor 190 to maintain system fuel pressure. The fuel systems are typically either return style and thus have a return fuel line to the tank or they are returnless (deadhead) style where the fuel is not returned to the gas tank.

The ECM 10 receives signals from a variety of engine sensors. Typical sensors are: Engine Coolant Temperature (ECT) Sensor 40, Knock Sensor 25, Manifold Absolute Pressure (MAP) Sensor 65, Throttle Position Sensor (TPS) 75, Manifold Air Temperature (MAT) Sensor 85, Mass Air Flow (MAF) Sensor 115, Exhaust Gas Oxygen (O2) Sensor 110, and the Crankshaft Sensor 90. Two other sensors shown in FIG. 1, Oil Pressure 45 and Vehicle Speed 120 are used for diagnostic purposes. One other sensor read by the ECM 10 is the Exhaust gas re-circulation Valve Position (EVP) Sensor 95 which lets the ECM know the Exhaust Gas Recirculation (EGR) Valve 105 is either opened or closed. The function of the EGR Valve 105 is to reduce exhaust emissions.

With ever tightening emissions standards through the 1970s and 1980s, EFI systems gained in popularity. One reason for this was the EFI systems ability to maximize the efficiencies of the Catalytic Converter 180. The Catalytic Converter 180 was first introduced in the US in 1975. EFI systems built in automobiles since 1996 additionally have On Board Diagnostics (OBD) 60. OBD 60 enables service centers an expedient way to check the operation of the components in the EFI system. Service technicians connect their diagnostic equipment to OBD via the Test Connector 50. OBD is an important feature to aid with the regulation of exhaust pollution as motor vehicle ages.

Figure 2:
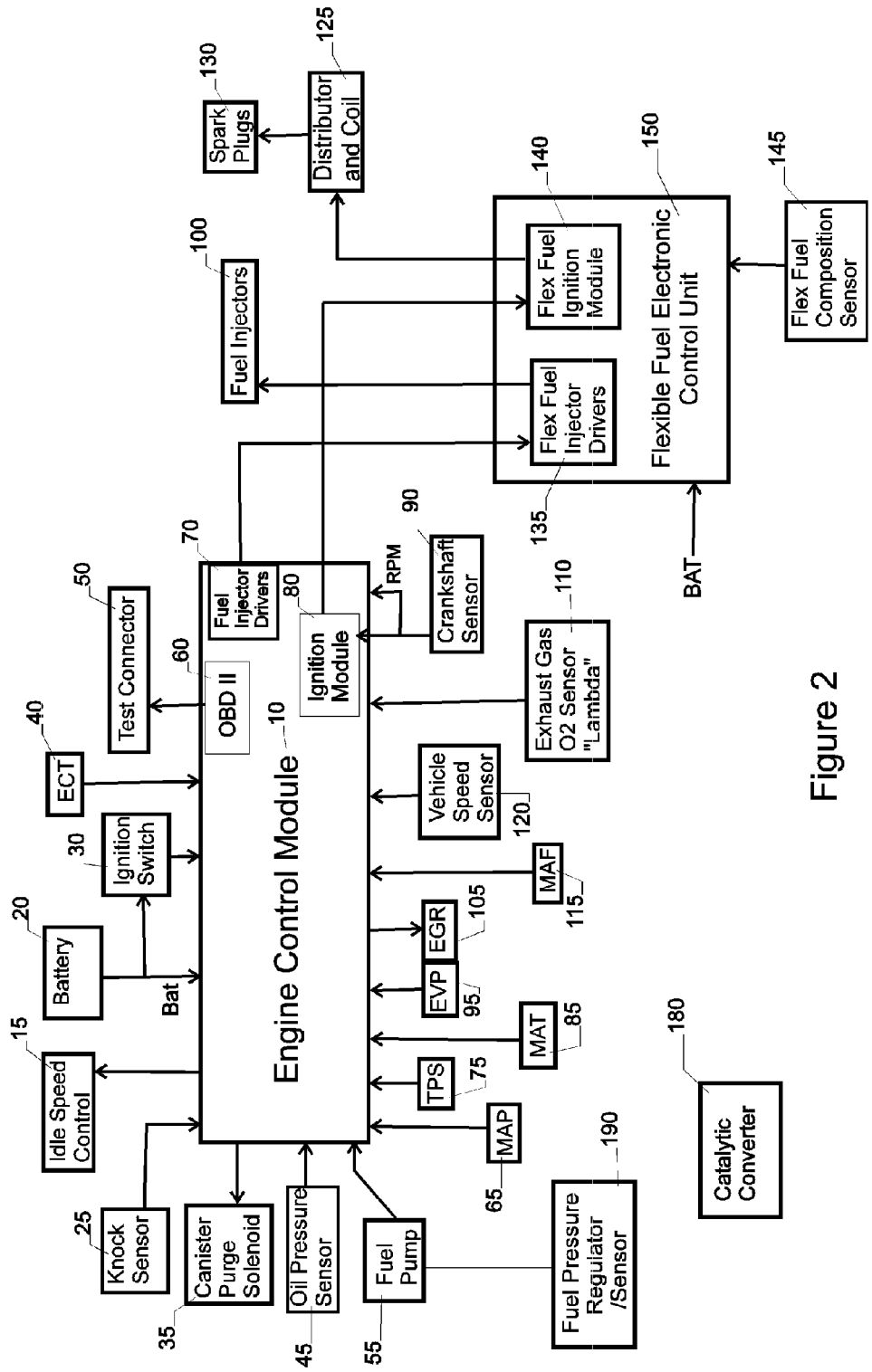
FIG. 2 is a diagram showing the conversion of an OEM EFI system according to the invention

In FIG. 2, the major components of the flexible fuel engine control system according to the present invention are shown. These components consist of the Flexible Fuel Electronic Control Unit 150, the Flexible Fuel Composition Sensor 145, the Flexible Fuel Injector Driver Circuit 135 and the Flexible Fuel Ignition Module 140. The Flexible Fuel Injector Driver Circuit 135 and the Flexible Fuel Ignition Module 140 are shown internal to the Flexible Fuel Electronic Control Unit 150 but either one or both could be external modules. The sole function of the Flexible Fuel Electronic Control Unit 150 is to control the timing of the firing of the Spark Plug(s) 130 and to meter the consumption of fuel via the Fuel Injector(s) 100 in accordance with input from the Flexible Fuel Composition Sensor 145. The Flexible Fuel Electronic Control Unit 150 receives fuel and ignition input signals from the ECM 10 and then modifies those signals based on the input from Flexible Fuel Composition Sensor 145 or an Exhaust Gas O2 sensor 110 (connection not shown) or additional exhaust gas O2 sensor (not shown). The Flexible Fuel Electronic Control Unit 150 sends modified ignition signals on to the Spark Plug(s) 130 via the Distributor 125 and sends modified fuel signals on to the Fuel Injector(s) 100.

In more modern engines that do not have distributors but instead have ignition coils for each spark plug, the Flexible Fuel Control Unit 150 controls ignition timing by modifying the OEM ECM's ignition signals that go to each of the spark plug coils. The Flexible Fuel Control Unit 150 modifies the ignition signals by interceding in the ignition wiring harness prior to each coil in the same fashion that is shown in FIG. 2 for the single coil system using a distributor.

In some engine platforms with EFI it may be necessary to either supplement the OEM stock fuel injectors with one or more additional fuel injectors or to replace the OEM stock fuel injectors with larger capacity injectors, as higher concentrations of alternate fuels in the fuel mixture require a greater amount of fuel injected per mass of air. In either case the Flexible Fuel Electronic Control Unit 150 sends fuel signals to the OEM stock injectors or their replacements and any additional supplemental injectors or both depending upon the system configuration. It is also possible that other components in the fuel system may need to be replaced. For example, the Electric Fuel Pump 55 and the fuel lines (not shown) may need to be replaced either for reasons of capacity or fuel compatibility.

If additional fuel injectors are added to supplement the stock OEM type system, they are commonly placed in the engine's air intake system either before or after the throttle body unit (not shown). The Flexible Fuel Electronic Control Unit 150 must be instructed as to whether the system is supplemental or not and what the system parameters are. In the case where upsized fuel injectors are used to replace stock ones, the Flexible Fuel Electronic Control Unit 150 must be informed as to the degree of the upsize in capacity change. In other words the Flexible Fuel Electronic Control Unit 150 must know the percentage increase in the capacity of the new replacement injectors over the stock values. One way this could be done is by having the user input both the original injector value and the new upsized injector value into the memory or firmware (instruction set) of the Flexible Fuel Electronic Control Unit 150. This is usually done through some sort of Graphic User Interface (GUI).

Figure 3:
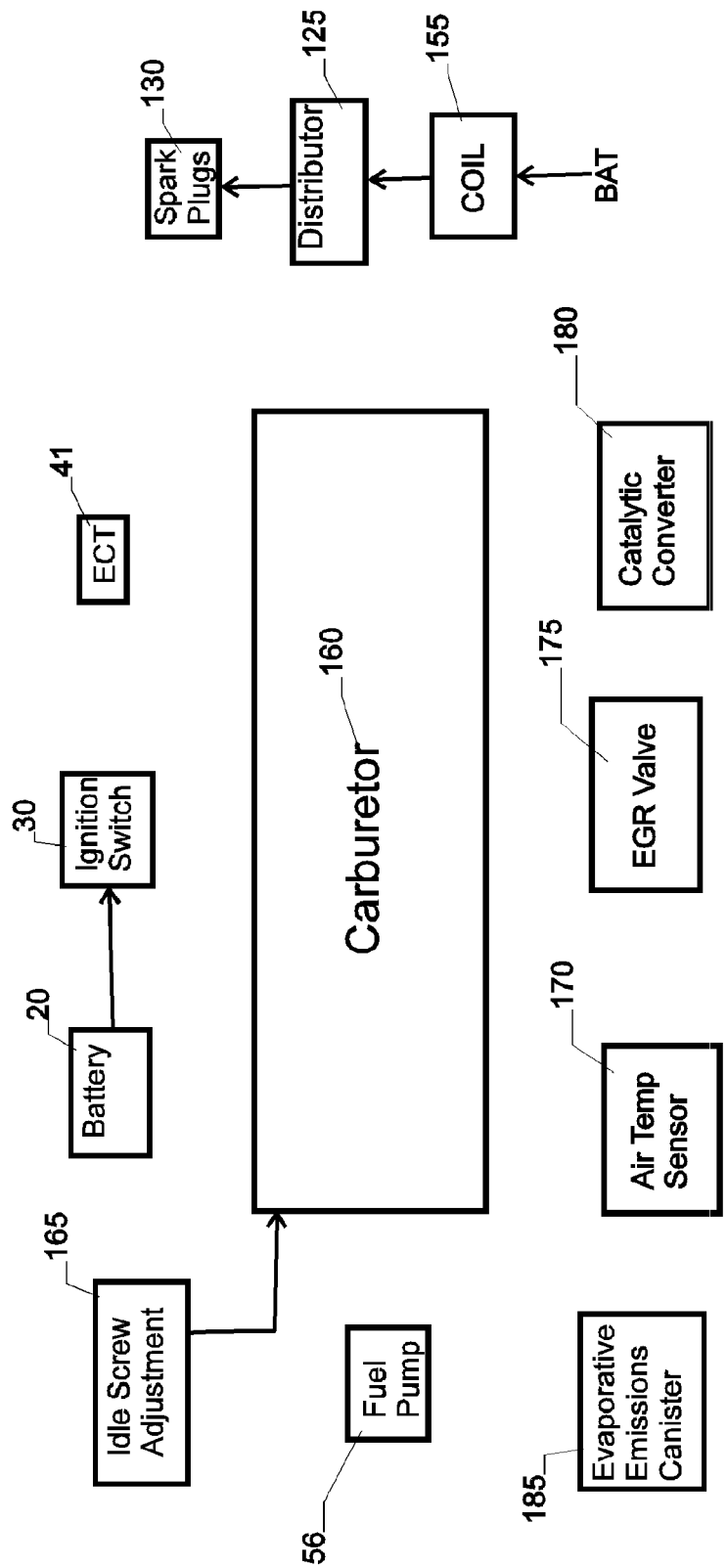
FIG. 3 is a diagram of typical modern carburetor fuel system

FIG. 3 refers to a typical modern carburetor fuel system found in engines prior to the advent of EFI. Although the carburetor itself is not modern, the fuel system contains modern emission control devices similar to those shown in FIG. 1. Emission control devices common to EFI and modern Carburetor systems are: EGR Valve 175, Evaporative Emissions Canister 185 and the Catalytic Converter 180. Carburetors are historically simple devices that do not require a variety of sensors to meter the fuel. Carburetor have been replaced by EFI systems as they are unable to accurately control the required air to fuel ratio commonly referred to as stoichiometric. Without being able to maintain stoichiometric, the Catalytic Converter 180 is unable to operate at its highest effectiveness to remove harmful emissions from the exhaust. Because the Carburetor 160 uses fixed jets to meter the fuel it cannot by itself properly deliver the correct amount of fuel for varying fuel mixtures like E85 or M85. Since the physical diameter of the jets needs to be changed in order to change the air to fuel ratio, the carburetor cannot by itself be used in a flexible fuel system. So the carburetor must either be replaced or supplemented with an electronic system that is fuel flexible.

Figure 4:
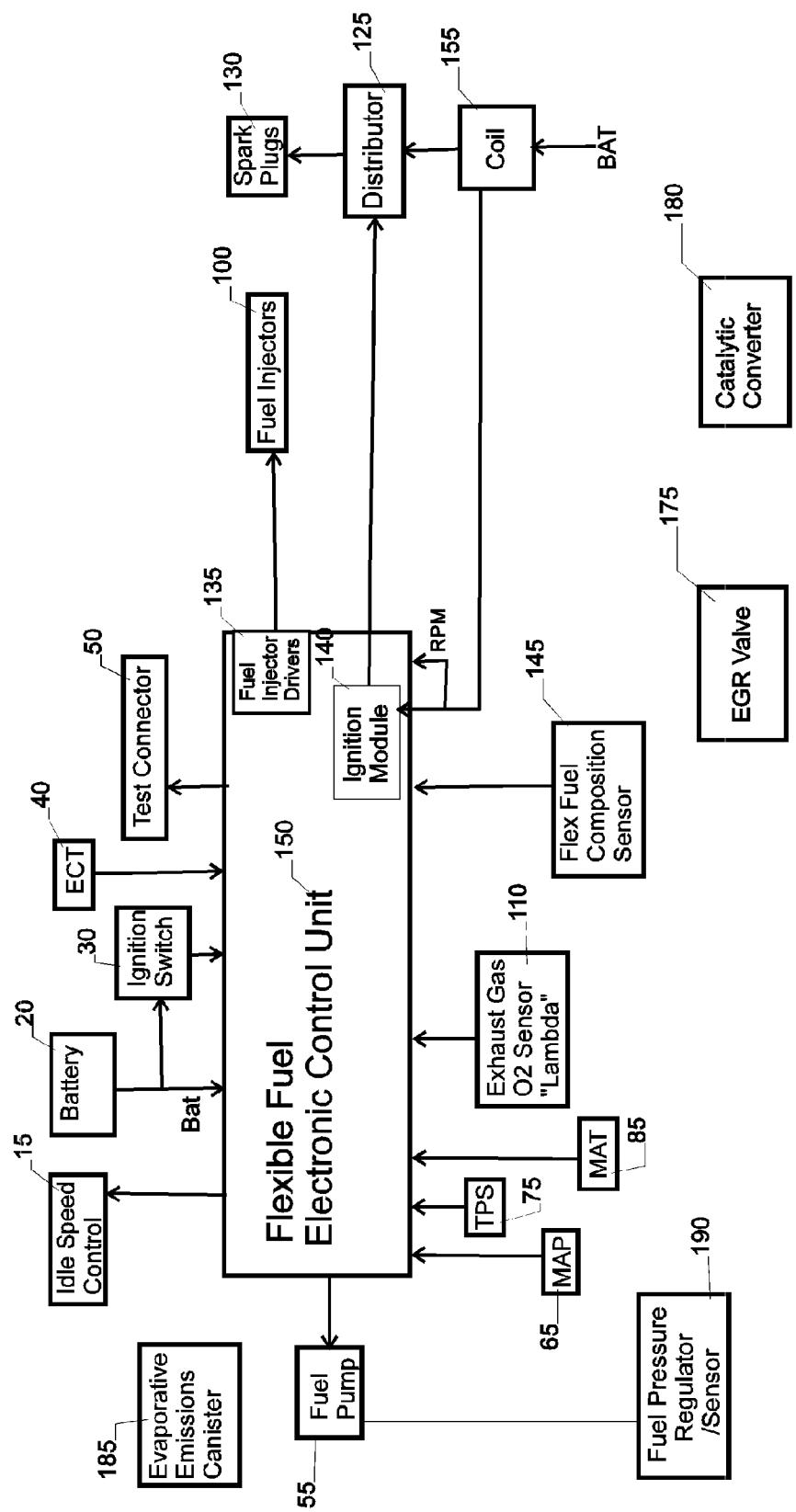
FIG. 4 is a diagram showing the conversion of a carburetor fuel system according to the invention, where the carburetor is replaced with a fuel injection system.

The conversion of a carburetor system into a system that is fuel flexible can be accomplished in several different ways. One method is to remove the carburetor and install a complete EFI system with flexible fuel capability. The result of this modification is shown in FIG. 4 and the main components of the conversion are: the Flexible Fuel Control Unit 150 containing the Fuel Injector Driver(s) 135, Exhaust Gas Oxygen Sensor 110 (either narrowband or wideband type), and Ignition Module 140 and the Flexible Fuel Composition Sensor 145. In this embodiment of the present invention, the Flexible Fuel Control Unit 150 receives inputs from a variety of sensors and controls the operation of the engine. The Flexible Fuel Control Unit 150 controls the operation of the engine by controlling the timing of the firing of the Spark Plug(s) 130 and by metering fuel to the engine via the Fuel Injector(s) 100. The Flexible Fuel Control Unit 150 also controls other aspects of the engine like the OEM ECM does in FIG. 1.

In the same spirit as the conversion shown in FIG. 2, the conversion in FIG. 4 does not modify or replace any of the OEM emission control devices used in the carburetor fuel system. However since the flexible fuel engine control system will operate the engine at air to fuel ratios much closer to stoichiometric, the exhaust emissions of the converted engine are generally reduced. For proper operation the sensors, ECT 40, MAP 65, TPS 75, MAT 85 and the Exhaust Gas O2 Sensor 110 are added to the engine. The addition of the sensors often requires that the intake manifold of the engine be mechanically changed to allow for mounting of the sensors. Similarly the intake manifold or intake air system is modified for the additional of the Fuel Injector(s) 100. The installation of the Exhaust Gas O2 Sensor 110 often requires a minor modification to the exhaust system. In some cases one or more pre-existing exhaust gas O2 sensors may already be in the OEM exhaust system.

FIG. 4 also demonstrates control of the ignition timing with the Flexible Fuel Ignition Module (140). The stand-alone stock ignition system shown in FIG. 3 is however quite usable and continual usage reduces the cost of the additional components. One advantage of adding the Ignition Module 140 is the module's ability to adaptively change timing. This would allow the engine to use fuels with different octane ratings and still avoid engine knock in high compression ratio engines. Another advantage of the Ignition Module 140 is to advance timing beyond its stock OEM timing to improve engine efficiency, increase the power of the engine and thus reduce the vehicle's fuel consumption.

Figure 5:
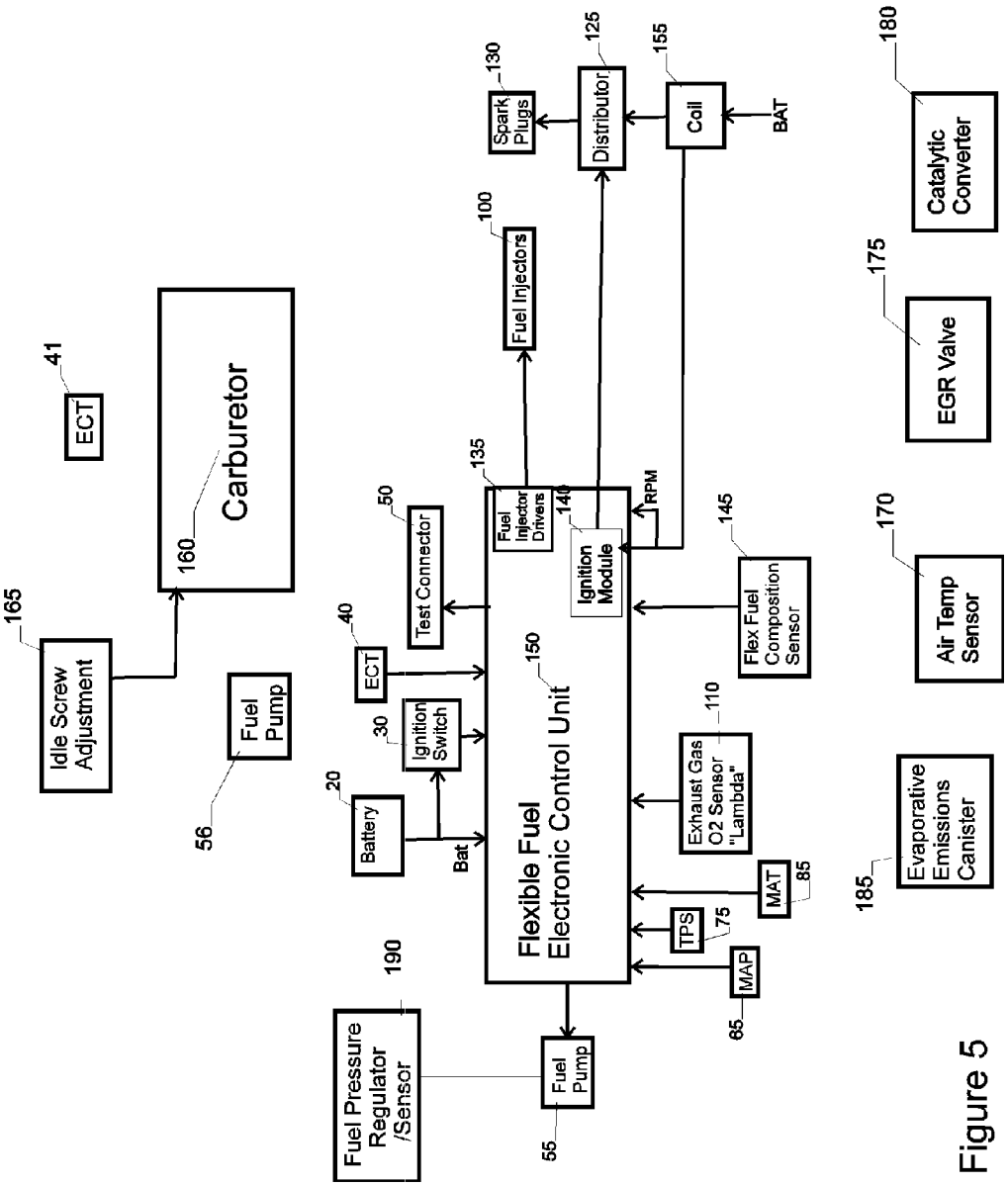
FIG. 5 is a diagram showing the conversion of a carburetor fuel system according to the invention, where the carburetor is retained and functions as normal.

FIG. 5 shows an alternate method of converting a carburetor fuel system into a flexible fuel system. In this embodiment of the present invention, the Carburetor 160 is not replaced but functions as normal and is therefore supplemented by the addition of the flexible fuel control system. One or more Fuel Injector(s) 100 is mounted about the Carburetor 160 and are controlled by the Flexible Fuel Electronic Control Unit 150. The Flexible Fuel Electronic Control Unit 150 receives a variety of sensor inputs similar to the OEM ECM in FIG. 1 and also receives input from the Flexible Fuel Composition Sensor 145 and/or an Exhaust Gas Oxygen (O2) Sensor 110 of either narrowband or wideband type. The Flexible Fuel Electronic Control Unit 150 uses either a direct fuel measurement from the Flex Fuel Sensor 145 or a lean/rich condition from the Exhaust Gas Oxygen (O2) Sensor 110 to determine the percentage of alternate fuel in the fuel mixture.

If a significant percentage (usually greater than 10%) of alternate fuel is present in the fuel mixture, the Carburetor 160 will no longer be able to maintain a proper air to fuel ratio for combustion. The Flexible Fuel Electronic Control Unit 150 will sense the presence of the alternate fuel and/or its associated lean/rich mixture and then compensate by adding fuel into the combustion process via the Fuel Injector 100. It is envisioned that the Fuel Injector 100 will typically be placed either in the air stream prior to the air entering the Carburetor 160 or be placed under the Carburetor 160 in a plate similar to the method in which Nitrous Oxide is introduced into racing engines. As a result the Carburetor 160 and the Fuel Injector 100 will work together to provide the proper amount of fuel required by the engine regardless of the composition of the fuel mixture in the OEM type fuel tank.

In large horsepower engine applications where multiple carburetors are used or a multi-barrel carburetor (ie. a 4 barrel carburetor) is used, it is reasonable that more than one fuel injector may be needed in the conversion to cover the wide dynamic range of fuel requirements. In some cases it may be necessary to use one or more, smaller capacity injectors in combination with one or more, larger capacity fuel injectors to cover the wide range. It is also possible that the small capacity injector may need to be driven separately from the larger capacity injector using a method of proportional drive in order to further widen the dynamic range of the fuel delivery. By using two separate injector drive circuits, the smaller injector could for example operate solo for idle and part throttle situations allowing the larger injector to come on line to support the smaller injector for heavy and full throttle situations.

In FIG. 5 the fuel flow (not shown) from the OEM type gas tank (not shown) would normally be pushed into the Carburetor 160 by the mechanical Fuel Pump 56. The mechanical Fuel Pump 56 is typically a diaphragm type pump which is attached to the engine block and driven by the engine's camshaft. Mechanical fuel pumps are generally less expensive than electric fuel pumps and are generally capable of supplying the additional fuel needed by the use of alternate fuels in an engine but may not be made material compatible to the alternate fuel. The mechanical Fuel Pump 56 may not be capable of delivering the appropriate fuel pressures needed to operate fuel injectors. Pumps of piston type of constructed usually are but are rare to find in the market. In cases where a mechanical fuel pump can not supply sufficient fuel pressure, the Electric Fuel Pump 55 could be fed in series by the mechanical Fuel Pump 56. In this way, the Electric Fuel Pump 55 is used as a booster pump to provide the high fuel pressure typically needed to operate the Fuel Injectors 100.

In other applications, the Electric Fuel Pump 55 might be used by itself in a return-less (deadhead) type system. In a deadhead system, the Fuel Pump 55 could be controlled via Pulse Width Modulation (PWM) by a control circuit in the Flexible Fuel Electronic Control Unit 150. Proper fuel line pressure is maintained via the Flexible Fuel Electronic Control Unit 150 monitoring the Fuel Pressure Sensor 190 which is mounted in the fuel line with the Fuel Injectors 100 and then PWM the Fuel Pump 55 to maintain the fuel pressure needed by the Fuel Injector 100.

Before the advent of return-less fuel systems, EFI engines were plumbed with return type fuel system that simply turned power on and off to the electric Fuel Pump 55. Regulation of fuel pressure was left to a mechanical device know as a Fuel Pressure Regulator 190 that was mounted in the fuel return line. In the process of converting return systems to be flexible fuel the fuel system components (ie. fuel pump, fuel lines, regulator, etc.) remain intact so long as they have the extra capacity needed to supply the engine based upon the alternate fuel being used and so long as the components are compatible with the alternate fuel. If not the fuel system components need to be rebuilt or replaced.

Figure 6:
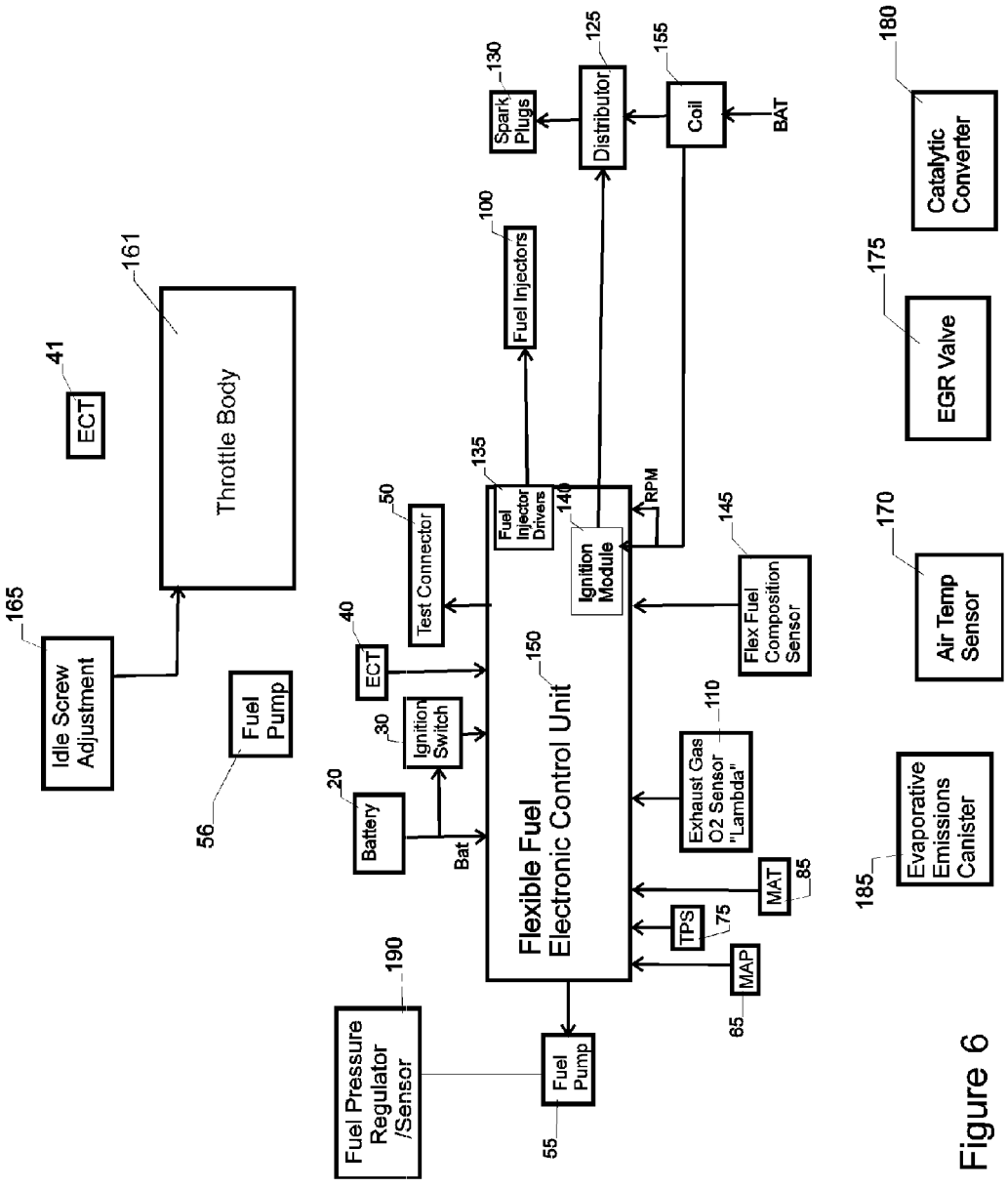
FIG. 6 is a diagram showing the conversion of a carburetor fuel system according to the invention, where the carburetor is retained but functions as a throttle body only.

FIG. 6 depicts that same system as shown in FIG. 5 but with the exception that the Carburetor 160 in FIG. 5 is not used to flow fuel and thus acts like an inexpensive Throttle Body 161. In this case, the Throttle Body 161 flows air only and the Fuel Injector (100) provides all the fuel that is needed to operate the engine correctly regardless of the composition of the fuel mixture. Typically this conversion would require that the fuel line to the carburetor be disconnected and removed or blocked in such a way so that no fuel or air can enter the carburetor's fuel inlet. The Fuel Injector 100 could be mounted in the system either before or after the Throttle Body 161. It is also possible that the carburetor could be replaced with a throttle body unit that was manufactured without provisions to handle the flow of fuel or with a Throttle Body Fuel Injection unit as shown in FIG. 7.

Figure 7:
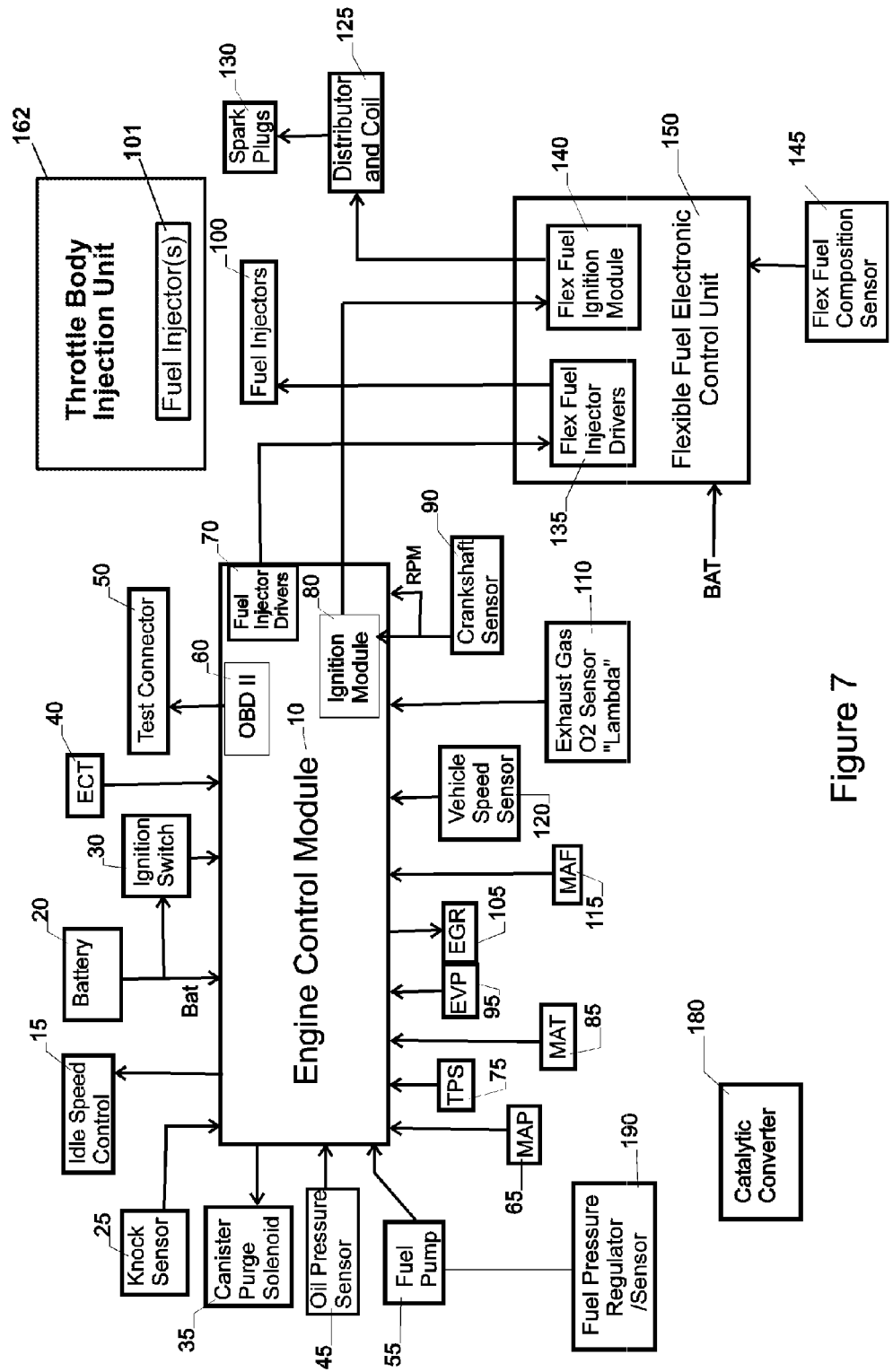
FIG. 7 is a diagram showing the conversion of a throttle body fuel injection fuel system according to the invention.

FIG. 7 depicts a similar system as shown in FIG. 2 but for a particular type of OEM fuel injection know as Throttle Body Fuel Injection (TBI). This type of fuel injection is converted to flexible fuel operation in a similar manner to that shown in FIG. 2, with the exception being that the OEM type Fuel Injector(s) 101, which are typically located in the TBI Unit 162 itself may not be used to flow fuel. In this application, the Throttle Body Fuel Injection Unit 162 is used to flow air only and additional Fuel Injector(s) 100 are placed either before (upstream) or after the throttle body (downstream) to handle all the fuel flow requirements of the engine regardless of the composition of the fuel mixture. As in the system of FIG. 2, the amount of the fuel to be added to the engine is determined by the Flexible Fuel Electronic Control Unit 150 after taking inputs from either the Flex Fuel Sensor 145 or the Exhaust Gas Oxygen (O2) Sensor 110 (connection not shown) or other additional O2 sensor (not shown). In some cases both types of sensors maybe used together to determine fuel composition and the resulting correct air to fuel ratio needed for proper combustion.

If the TBI Fuel Injector(s) 101 are used to flow fuel similar to the Fuel Injectors 100 in the EFI system in FIG. 2, then the TBI Fuel Injectors 101 may be used as is or they may be replaced with larger capacity versions. If the TBI Fuel Injectors 101 are to remain of original type (with their stock flow characteristics) then one or more additional Fuel Injector(s) 100 are added to supplement them. The added Fuel Injector(s) 100 can be placed into the air flow of the fuel system either before or after the Throttle Body Unit 162 and can be of different capacities to cover the wide dynamic range of fuel requirements of the converted engine. It should be noted that in this application the Fuel Electronic Control Unit 150 can control the added Fuel Injector(s) 100 without effecting the operation of the original TBI Fuel Injectors 101. This is also true for engines with multi-port or direct fuel injection like described in FIG. 2 or other types of fuel systems that may exist that are within the scope of this invention.

Figure 8:
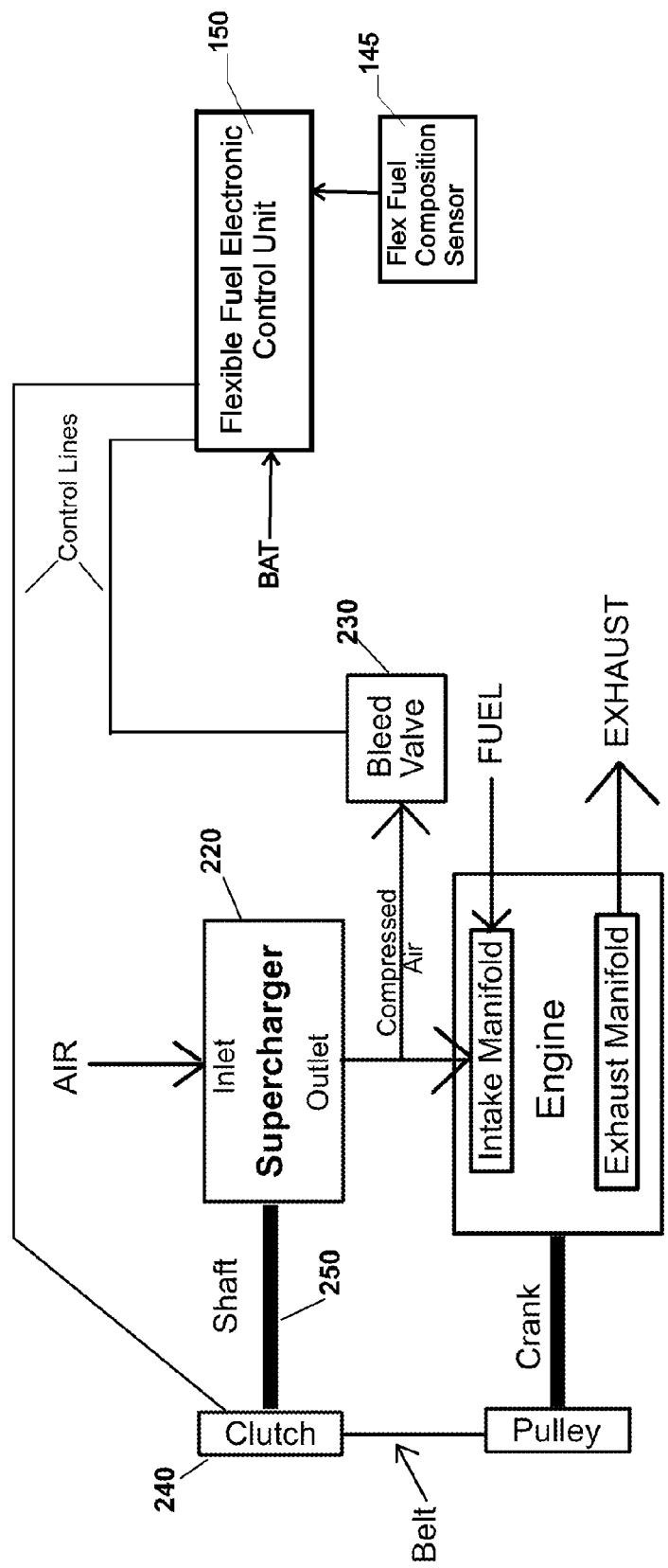
FIG. 8 is a diagram showing the conversion of a supercharged engine.
Figure 9:
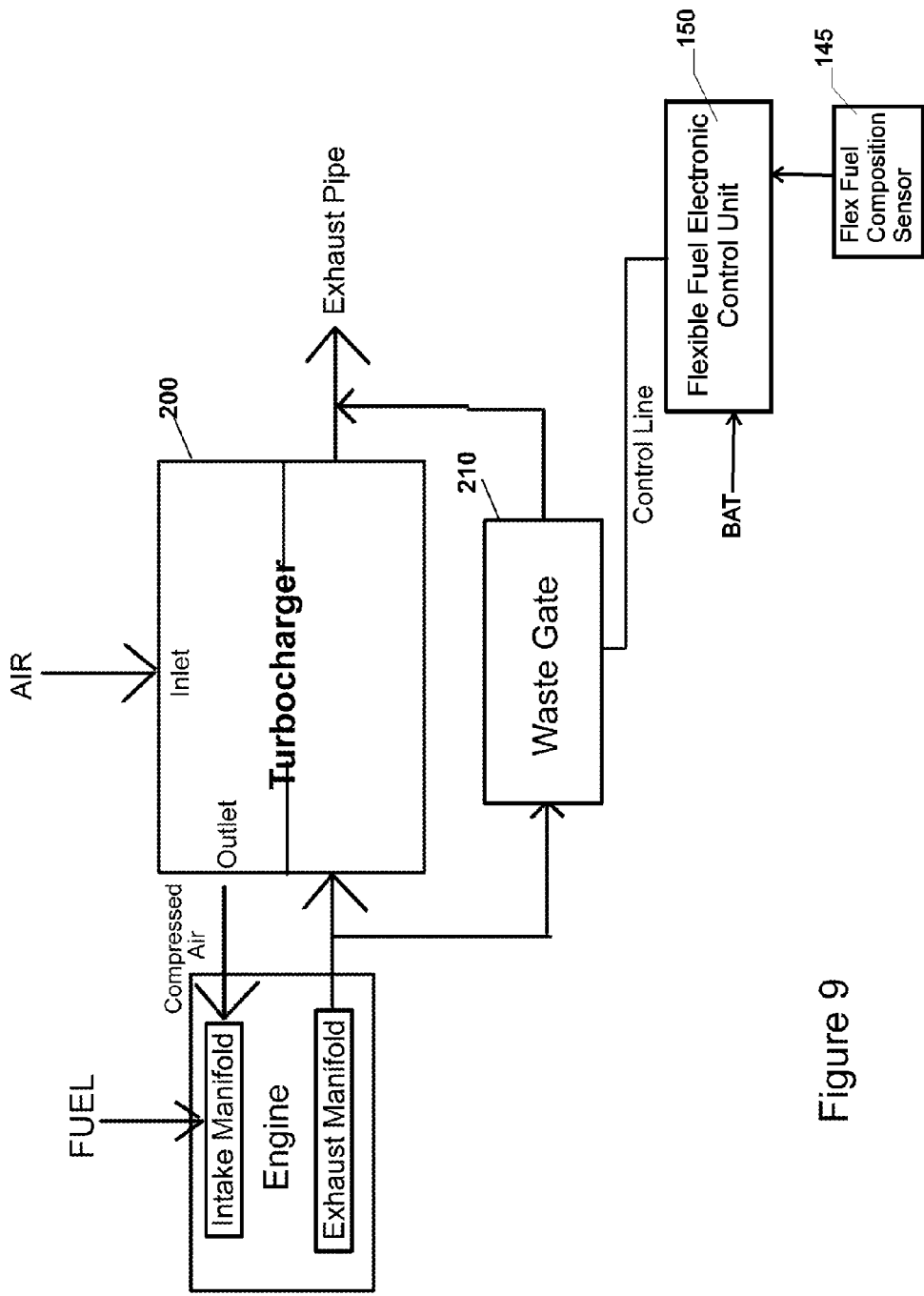
FIG. 9 is a diagram showing the conversion of a turbocharged engine.

FIGS. 8 and 9 show further uses of the flexible fuel conversion system in conjunction with engines that have a turbocharger or a supercharger. In these configurations the amount of alternate fuel in the fuel mixture is first determined and then that amount is used to determine the octane rating of the fuel mixture. The octane rating of the fuel is then used to determine the amount of intake manifold pressure or boost that the engine can tolerate. Alternate fuels like alcohol have higher octane ratings than conventional gasoline fuels and the higher octane fuel allows an engine to operate at higher boost pressures. Higher boost pressure equates to greater horsepower which enables a vehicle to use a smaller more efficient engine than what would normally be used.

Another way to increase the efficiency of an engine would be to increase the engine's compression ratio. The higher the engine's compression ratio the more efficient the engine and the greater horsepower delivered. As the compression ratio rises however so must the octane of the fuel. Therefore it would be beneficial to vary the compression ratio of an engine in regards to the composition of the fuel mixture. However engines with variable compression ratios are not currently in mass production. Most techniques to enable higher compression ratio engines to operate on lower octane fuels is done via ignition timing control as previously discussed. Timing is retarded to allow operation on lower octane fuels. The amount of ignition retard (i.e., reduction in timing advance) generally leads to degraded engine performance as a negative consequence. The amount of retard can vary for different types of engine construction, therefore it may be necessary for a user to input the timing retard (or advance) values into the Flexible Fuel Electronic Control Unit's 150 memory or instruction code (firmware). This is usually done through some sort of Graphic User Interface (GUI).

In FIG. 8, the Flexible Fuel Electronic Control Unit 150 uses the Flex Fuel Composition Sensor 145 to determine the octane rating of the fuel mixture and then controls the amount of intake manifold pressure boost by controlling aspects of the Supercharger 220. There are several ways to control boost pressure in a Supercharger. In general, boost is controlled by varying the flow of air into the intake manifold and thus the intake manifold pressure generated by the Supercharger's blower (not shown). One way boost pressure can be controlled is via a Bleed Valve 230. Alternately another way this can be done is by using a Clutch 240 on the Blower Shaft 250 where the Flexible Fuel Electronic Control Unit 150 controls the amount of boost by controlling the clutching mechanism whereby affecting the rotational speed of the Supercharger's blower blades (not shown).

In FIG. 9, the Turbocharger 200 operates in much the same way as the Supercharger 220 does in FIG. 8. In FIG. 9, the Flexible Fuel Electronic Control Unit 150 uses the Flex Fuel Composition Sensor 145 to determine the octane rating of the fuel and then controls the amount of pressure boost in the engine's intake manifold by controlling the turbocharger's Waste Gate 210. The Waste Gate 210 is most commonly used to control boost in a turbocharger system. The Waste Gate 210 is used to bypass a certain amount of exhaust gas around the turbochargers blower. By controlling the opening and closing of the Waste Gate 210, the Flexible Fuel Electronic Control Unit 150 can control the amount of boost by controlling the rotational speed of the Turbocharger's blower blades (not shown). There are additional ways to control boost in both supercharged and turbocharged engines and it should be understood that regardless of the control mechanism the present invention is to control boost based upon the composition of the fuel mixture thereby optimizing the power and efficiency of the engine. It also should be noted that besides controlling boost, the flexible fuel conversion system controls the air to fuel ratio and the ignition timing of the engine to ensure that the engine operates at its highest efficiency regardless of the composition of the fuel mixture being used.

The invention has been described in detail with particular reference to certain preferred embodiments thereof, but it will be understood that variations and modifications can be effected within the spirit and scope of the invention.

PARTS LIST

10 OEM type Engine Control Module (ECM)
15 Idle Speed Control Valve or Motor
20 Battery
25 Knock Sensor
30 Ignition Switch
35 Canister Purge Solenoid
40 EFI Engine Coolant Temperature (ECT) Sensor
41 Carburetor Engine Coolant Temperature (ECT) Sensor
45 Oil Pressure Sensor
50 Test Connector
55 Electric Fuel Pump
56 Mechanical Fuel Pump
60 On-Board Diagnostics (OBD) II Module
65 Manifold Absolute Pressure (MAP) Sensor
70 Fuel Injector Driver(s)
75 Throttle Position Sensor (TPS)
80 Ignition Module
85 Manifold Air Temperature (MAT) Sensor
90 Crankshaft Sensor
95 EGR Valve Position (EVP) Sensor
100 Fuel Injector(s)
101 TBI Fuel Injector(s)
105 Exhaust Gas Recirculation (EGR) Solenoid
110 Exhaust Gas Oxygen (O2) Sensor—narrowband or wideband
115 Mass Air Flow (MAF) Sensor
120 Vehicle Speed Sensor
125 Distributor—spark generating device
130 Spark Plug(s)
135 Flexible Fuel Injector Driver(s)
140 Flexible Fuel Ignition Module
145 Flexible Fuel Composition Sensor
150 Flexible Fuel Electronic Control Unit
155 Ignition Coil
160 Carburetor
161 Throttle Body
162 Throttle Body Fuel Injection Unit
165 Idle Adjustment Screw
170 Air Temperature Sensor
175 EGR Valve
180 Catalytic Converter
185 Evaporative Emissions Canister
190 Fuel Pressure Regulator/Sensor
200 Turbocharger
210 Waste Gate
220 Supercharger
230 Bleed Valve
240 Clutch
250 Blower Shaft

What is claimed is:

1. An apparatus converting an OEM type engine having an OEM type of fuel system and exhaust system using an OEM type recommended fuel fed to the engine from an OEM type fuel tank, the apparatus comprising:
    varying proportions of an alternate fuel being mixed with the OEM recommended fuel in the OEM type fuel tank to form a varying fuel mixture;
    a sensor added to detect the proportional amount of alternative fuel in the fuel mixture being fed to the OEM fuel system from the OEM fuel tank, the sensor being selected from a group consisting of:
        a) an exhaust gas $O_2$ sensor; and
        b) a fuel composition sensor;
    a fuel injector driver circuit added to the OEM type engine to control an output signal to a fuel injector;
    an electronic control unit added to the OEM type engine to control the fuel injector driver circuit, the electronic control unit being arranged to receive an input signal from the sensor; and
    the electronic control unit being arranged to change the output signal from the fuel injector driver circuit to the fuel injector to vary the amount of the fuel being metered into the OEM type engine to control the engine's operating condition to maintain a correct air-to-fuel ratio needed for proper combustion of the fuel mixture fed from the OEM fuel tank.

2. The apparatus of claim 1, wherein the exhaust gas $O_2$ sensor is selected from the group consisting of a wideband oxygen sensor and a narrowband oxygen sensor.

3. The apparatus of claim 1 wherein the fuel injector is an additional fuel injector added to the OEM type fuel system and is controlled by the electronic control unit.

4. The apparatus of claim 1 wherein more than one fuel injector is added to the OEM type engine and controlled by the electronic control unit.

5. The apparatus of claim 1 wherein both the exhaust gas $O_2$ sensor and the fuel composition sensor are used together.

6. The apparatus of claim 1 wherein both the exhaust gas $O_2$ sensor and the fuel composition sensor are arranged to simultaneously detect the proportional amount of alternate fuel being fed into the OEM engine.

7. The apparatus of claim 1 wherein the OEM fuel system contains an OEM type carburetor or OEM type throttle body and the fuel injector is placed in communication with the carburetor or throttle body to provide additional fuel from the OEM type fuel tank as commanded by the electronic control unit.

8. The apparatus of claim 7 wherein the OEM type throttle body or carburetor is configured to flow air only, and the added fuel injector provides all the fuel that is needed to control the engine's operating condition regardless of the composition of the fuel mixture in the OEM type fuel tank.

9. The apparatus of claim 1 wherein the OEM fuel system includes an OEM type engine control module, and the electronic control unit receives as an input fuel injector drive signals from the OEM type engine control module and then modifies those drive signals based on a signal from the sensor in order to control the operating condition of the OEM type engine.

10. The apparatus of claim 1 further including an ignition control circuit for controlling ignition timing of the engine based upon the proportional amount of alternative fuel in the fuel mixture being fed to the OEM fuel system from the OEM fuel tank.

11. The apparatus according to claim 10 wherein an ignition timing signal is received by the ignition control circuit from either an OEM type engine control module or an OEM type engine's spark generating device.

12. The apparatus according to claim 11 wherein the ignition timing signal received by the ignition control circuit is then delayed or advanced by the ignition control circuit before being sent to the spark generating device.

13. The apparatus of claim 12 wherein the ignition control circuit is located in the electronic control unit.

14. The apparatus of claim 12 wherein the ignition control circuit uses input from the selected sensor to determine the octane of the mixed fuel and to then control engine timing.

15. The apparatus of claim 12 wherein the ignition control circuit is adapted to receive input from a user to set an amount of timing delay or advance for different operating conditions of the OEM type engine.

16. The apparatus of claim 1 wherein the fuel injector is an OEM type fuel injector that is part of the stock OEM fuel system and is controlled by the electronic control unit.

17. The apparatus of claim 1 wherein the electronic control unit can receive input from a user to set a capacity value for the fuel injector being controlled by the electronic control unit.

18. The apparatus of claim 1 wherein the apparatus uses more than one independent fuel injector drive circuit to individually control more than one fuel injector used to increase the dynamic range of the fuel delivery of the OEM type engine.

19. The apparatus of claim 1 wherein the electronic control unit uses input from a fuel composition sensor to determine the octane rating of the fuel mixture in the OEM type fuel tank and then uses that octane determination to control the amount of intake manifold pressure boost of the OEM type engine by a turbocharger or by a supercharger.

20. The apparatus of claim 19 wherein the electronic control unit controls the amount of pressure boost in the OEM type engine's intake manifold by controlling a waste gate in a turbocharger system.

21. The apparatus of claim 1 wherein the electronic control unit maintains proper fuel line pressure and controls fuel line flow capacity via control of OEM type electric fuel pump.

22. A method of converting OEM type engine using an OEM type recommended fuel fed to the engine from an OEM type fuel tank, the method comprising:
varying proportions of an alternate fuel being mixed with the OEM recommended fuel in the OEM type fuel tank to form a varying fuel mixture;
adding a sensor to detect the proportional amount of alternative fuel in the fuel mixture being fed to the OEM fuel system to the OEM fuel tank selected from a group consisting of:
a) an exhaust gas $O_2$ sensor; and
b) a fuel composition sensor;
adding a fuel injector driver circuit to control an output signal to a fuel injector;
providing an electronic control unit controlling the fuel injector driver circuit and receiving an input signal from the sensor; and
arranging the electronic control unit to change the output signal from the fuel injector driver circuit to the fuel injector to vary the amount of the fuel being metered into the OEM type engine to control the engine's operating condition to maintain a correct air-to-fuel ratio needed for proper combustion of the mixed fuel fed from the OEM fuel tank.

23. The method of claim 22 including optimizing the flexible fuel conversion of an OEM type turbocharged engine by controlling via the electronic control unit and a fuel composition sensor, the OEM engine's operating condition, and by controlling intake manifold boost pressure, fuel metering and ignition timing to improve engine efficiency and performance regardless of the composition of the fuel mixture.

24. The method of claim 22 including optimizing the flexible fuel conversion of an OEM type supercharged engine by controlling via the electronic control unit and a fuel composition sensor, the OEM engine's operating condition, and by controlling intake manifold boost pressure, fuel metering and ignition timing in order to improve engine efficiency and performance regardless of the composition of the fuel mixture.

25. The method of claim 22 including replacing or upgrading parts of the OEM fuel system that are not compatible with the alternate fuel or that limit the engine's performance or peak efficiency on the alternate fuel.

26. The method of claim 22 including controlling an OEM fuel pump to maintain proper fuel pressure and flow while operating on the alternate fuel.

27. The method of claim 22 including determining octane rating of the mixed fuel in the OEM type fuel tank based upon output of the sensor and then adjusting timing of the OEM type engine via an ignition control circuit to avoid engine knock and improve engine efficiency and performance regardless of the composition of the fuel.

* * * * *